United States Patent
Chen et al.

(10) Patent No.: US 8,561,912 B2
(45) Date of Patent: *Oct. 22, 2013

(54) RFID TAG HAVING CAPACITIVE LOAD

(71) Applicant: China Steel Corporation, Kaohsiung (TW)

(72) Inventors: Sung-Lin Chen, Kaohsiung (TW); Yi-An Wu, Kaohsiung (TW)

(73) Assignee: China Steel Corporation, Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/864,695

(22) Filed: Apr. 17, 2013

(65) Prior Publication Data
US 2013/0221106 A1    Aug. 29, 2013

Related U.S. Application Data

(62) Division of application No. 13/111,276, filed on May 19, 2011.

(30) Foreign Application Priority Data

May 28, 2010    (TW) ................................ 99117241 A

(51) Int. Cl.
*G06K 19/06*    (2006.01)
(52) U.S. Cl.
USPC ......................................... 235/494; 235/492
(58) Field of Classification Search
USPC ................................. 235/492, 494
See application file for complete search history.

(56) References Cited

U.S. PATENT DOCUMENTS

2009/0109034 A1*  4/2009  Chen et al. ................... 340/572.7
2011/0025471 A1*  2/2011  Popugaev et al. ............ 340/10.3

FOREIGN PATENT DOCUMENTS

TW    200913377 A    3/2009

OTHER PUBLICATIONS

Office Action and the Search Report issued on Jul. 15, 2013 by TIPO for the corresponding TW Patent Application No. 099117241 which cites TW200913377A.
English abstract translation for TW200913377A.

* cited by examiner

*Primary Examiner* — Steven S Paik
*Assistant Examiner* — Christle Marshall
(74) *Attorney, Agent, or Firm* — WPAT, P.C.; Anthony King

(57) ABSTRACT

The present invention relates to an RFID tag having capacitive load, including: an antenna unit, a capacitive load and an RFID device. The antenna unit includes two metal sheets and a conductive substrate, and the metal sheets are disposed at a corresponding position above the conductive substrate and electrically connected to the conductive substrate. The capacitive load is electrically connected to the metal sheets. The RFID device feeds the antenna unit by electrically connecting to the metal sheets or coupling. This dramatically decreases the operating frequency, so the imaginary part of impedance is higher with the same size of the antenna unit, thereby reducing the size of the RFID tag. As a result, the weight is reduced, the manufacture process is simplified and the subsequent structure can be easily adjusted.

2 Claims, 10 Drawing Sheets

RFID TAG HAVING CAPACITIVE LOAD

CROSS-REFERENCE TO RELATED APPLICATIONS

This is a divisional application of pending U.S. patent application Ser. No. 13/111,276, which is filed May 19, 2011, and claims the priority benefit of Taiwan application serial no. 099117241, filed May 28, 2010. The entirety of the above-mentioned patent application is hereby incorporated by reference herein and made a part of specification.

BACKGROUND OF THE INVENTION

1. Field of the Invention

The present invention relates to an RFID tag, and more particularly to an RFID tag having capacitive load.

2. Description of the Related Art

RFID (Radio frequency Identification) tags are directly attached to products, so it will encounter many problems during application. In conventional technology, the system cannot read the identification information in RFID tags in the case of, for example, products packaged with metal material, products with liquid content and so on. Especially in application with metal items, as metal is an ideal conductor and a perfect reflecting surface for electromagnetic waves, interference with signals often occurs when RFID tags are attached to metal items, and antennas close to the metal items cannot effectively receive and transmit electromagnetic waves; as a result, the effective reading distance of the system is decreased from meters to 1-2 centimeters, or the system totally fails.

In order to apply RFID technology to metal items such as automotive components, containers, industrial equipment and so on, specialized RFID tags have been developed, but such RFID tags in conventional technology are too big in size and costly. Therefore, developing specialized RFID tags for use with metal which are small and cost-efficient is a goal that has not yet been achieved.

Moreover, recent development in RFID technology is toward item-level, so miniaturization is desireable in the design of RFID tags. In conventional design of RFID tags at item-level, providing the necessary inductive reactance is the main purpose, and this conductive design totally depends on the length of a current loop; because of the limitation by physical characteristics, highly inductive tag antennas are relatively large in size, which goes against the requirement for further miniaturization.

Therefore, it is necessary to provide an RFID tag having capacitive load to solve the above problems.

SUMMARY OF THE INVENTION

The present invention is directed to an RFID (Radio frequency Identification) tag having capacitive load, comprising: an antenna unit, a capacitive load and an RFID device. The antenna unit includes two metal sheets and a conductive substrate, and the metal sheets are disposed at a corresponding position above the conductive substrate and electrically connected to the conductive substrate. The capacitive load is electrically connected to the metal sheets. The RFID device feeds the antenna unit by electrically connecting to the metal sheets or coupling.

The RFID tag having capacitive load according to the present invention can dramatically decrease the operating frequency, so the imaginary part of impedance is higher with the same size of the antenna unit, thereby reducing the size of the RFID tag. As a result, the weight is reduced, the manufacture process is simplified and the subsequent structure can be easily adjusted.

DETAILED DESCRIPTION OF THE INVENTION

Figure 1:
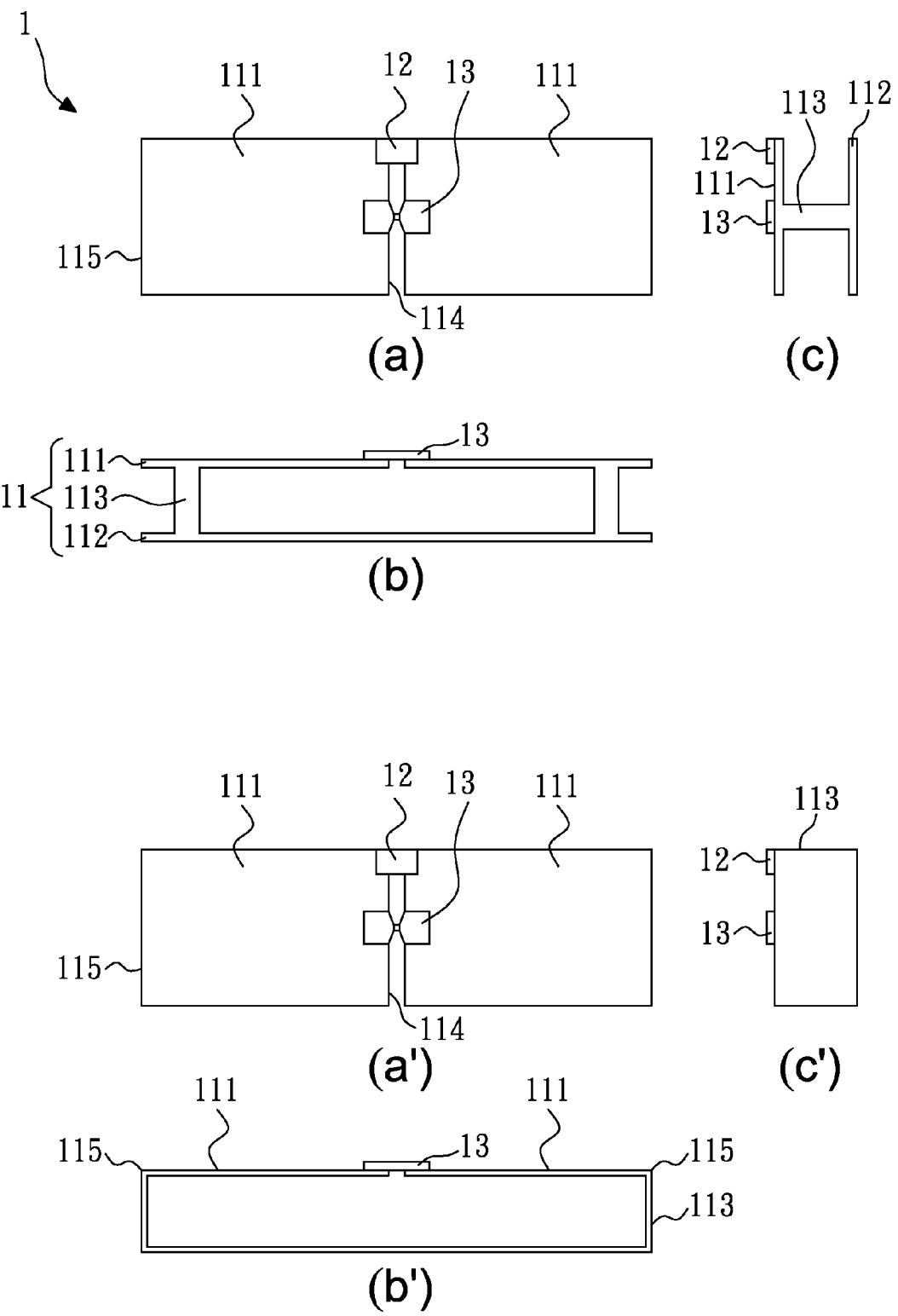
FIG. 1 is a schematic view of an RFID tag having capacitive load according to a first embodiment of the present invention.

FIGS. 1(a) to 1(c) and FIGS. 1(a') to 1(c') show schematic views of two forms of an RFID (Radio frequency Identification) tag having capacitive load according to a first embodiment of the present invention. FIG. 1(a) and FIG. 1(a') are top views; FIG. 1(b) and FIG. 1(b') are front views; and FIG. 1(c) and FIG. 1(c') are right views. Thus, in the following figures, FIG. (a) and FIG. (a') indicate top views, FIG. (b) and FIG. (b') indicate front views, and FIG. (c) and FIG. (c') indicate right views.

In this embodiment shown in FIGS. 1(a) to 1(c), the RFID tag 1 having capacitive load comprises: an antenna unit 11, a capacitive load 12 and an RFID device 13. The antenna unit 11 includes two metal sheets 111 and a conductive substrate 112, and the metal sheets 111 are disposed at a corresponding position above the conductive substrate 112 and electrically connected to the conductive substrate 112.

In this embodiment, the antenna unit 11 further includes two conductive portions 113, and the conductive portions 113 are electrically connected to the metal sheets 111 and the conductive substrate 112 respectively. The conductive portions 113 may be conductive pillars or conductive sheets. Each metal sheet 111 includes a first side 114 and a second side 115 corresponding to the first side 114, and the first sides 114 of the metal sheets 111 are close to and face each other, so that the metal sheets 111 are spaced apart from each other at a distance.

In this embodiment, the conductive portions 113 are conductive pillars, the conductive pillars approach the second sides 115 of the metal sheets 111 and are disposed between the metal sheets 111 and the conductive substrate 112 (see FIGS. 1(b) to 1(c)). In other applications, the conductive portions 113 may be conductive sheets, and the conductive sheets are electrically connected to the second sides 115 of the metal sheets 111 and two corresponding sides of the conductive substrate 112 (see FIGS. 1(b') to 1(c')).

Figure 2:
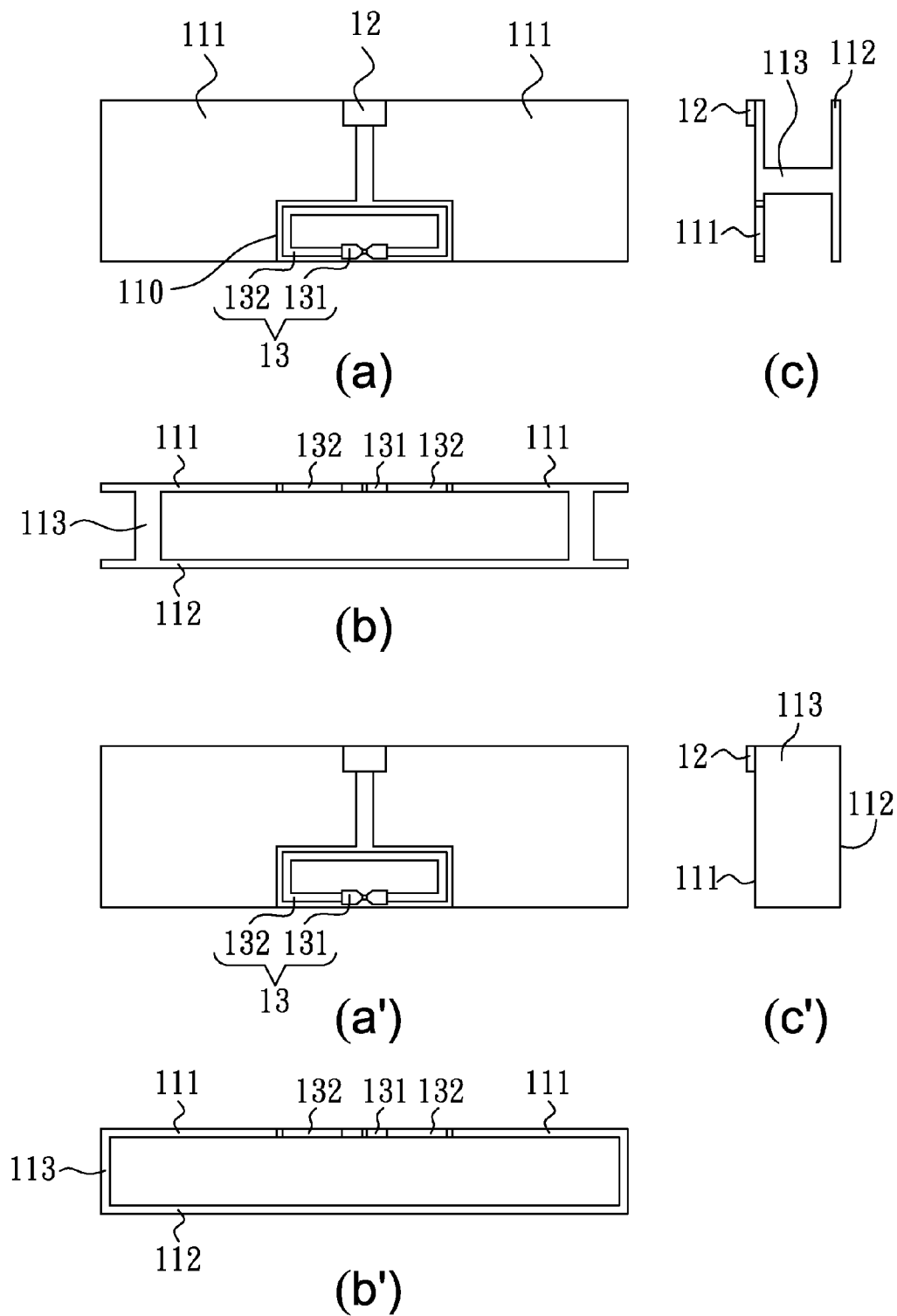
FIGS. 2 to 7 are schematic views of five different forms of the RFID tag having capacitive load according to the first embodiment of the present invention.

In this embodiment, the capacitive load 12 crosses the first sides 114 and is electrically connected to the metal sheets 111, and the RFID device 13 crosses the first sides 114 and is electrically connected to the metal sheets 111. It should be noted that, in other applications, the RFID device 13 may include an RFID chip 131 and a metal strap 132, wherein two ends of the metal strap 132 are connected to two ends of the RFID chip 131 to form a loop structure, and the RFID device 13 is disposed in a notch 110 formed between the metal sheets 111 and feeds the antenna unit 11 by coupling (as shown in FIG. 2).

Figure 3:
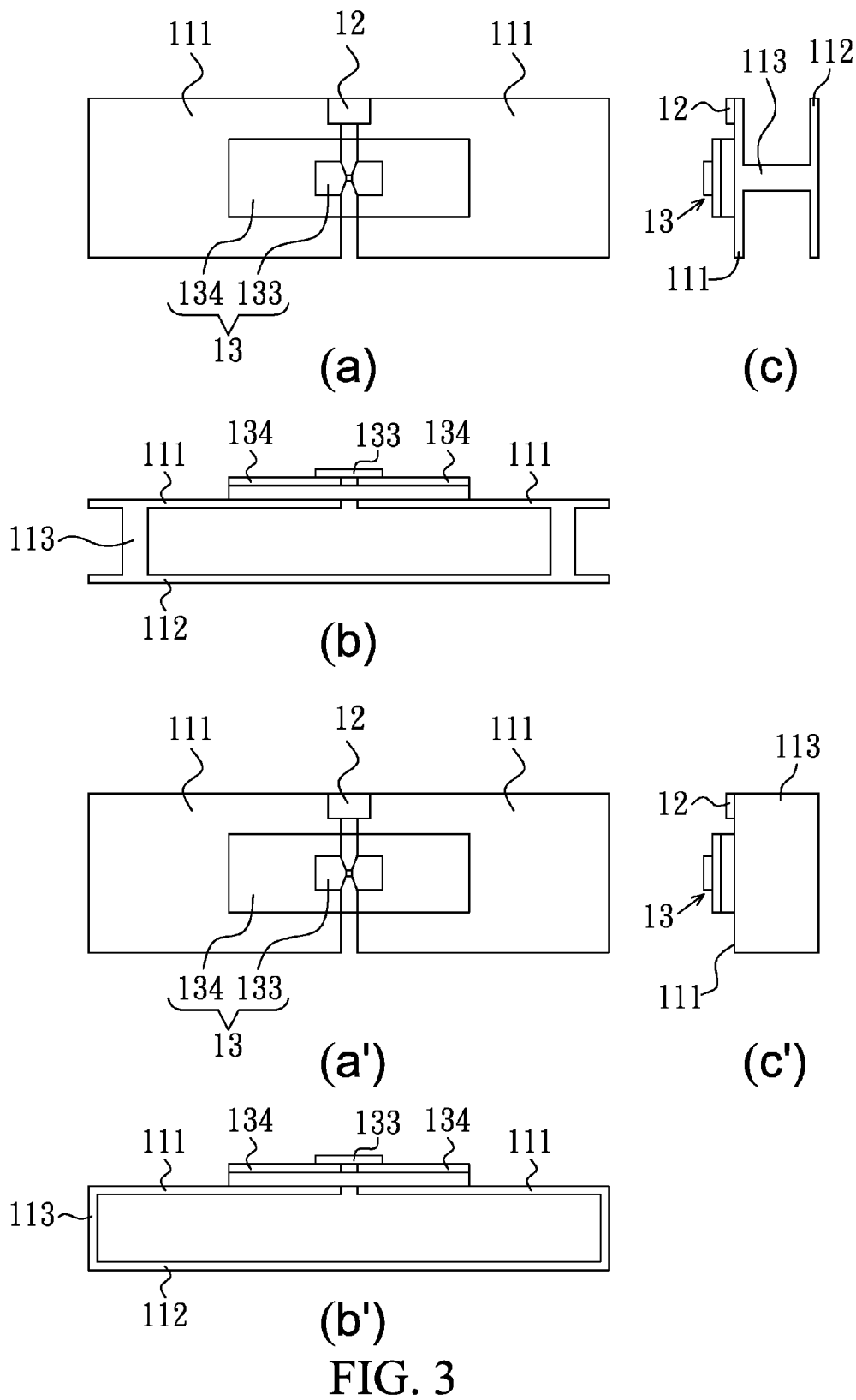

Alternatively, the RFID device 13 may further include an RFID chip 133 and two flank metal sheets 134, wherein the flank metal sheets 134 are disposed on a surface of a dielectric layer 14, the RFID chip 133 is electrically connected to the flank metal sheets 134, the RFID device 13 is spaced apart from the metal sheets 111 by the dielectric layer 14 and disposed at a corresponding position above the metal sheets 111, and the RFID device 13 feeds the antenna unit 11 by coupling (as shown in FIG. 3).

Figure 4:
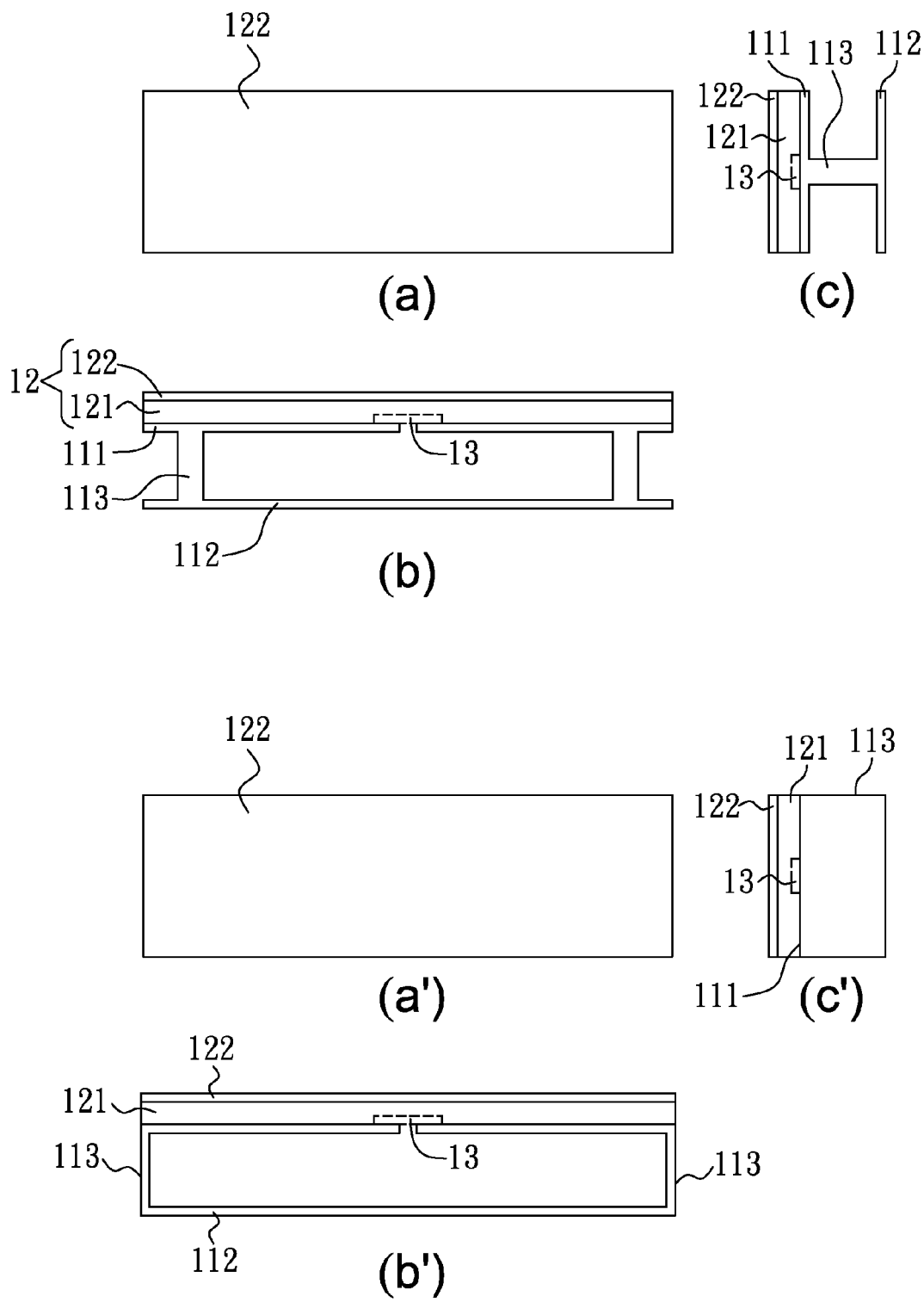

In FIGS. 1(a) to 1(c), the capacitive load 12 is an SMD (Surface Mount Device) capacitor element. It should be noted that the capacitive load 12 may include a load dielectric material 121 and a metal layer 122, and the load dielectric material 121 is disposed between the metal sheets 111 and the metal layer 112 (as shown in FIG. 4).

Figure 5:
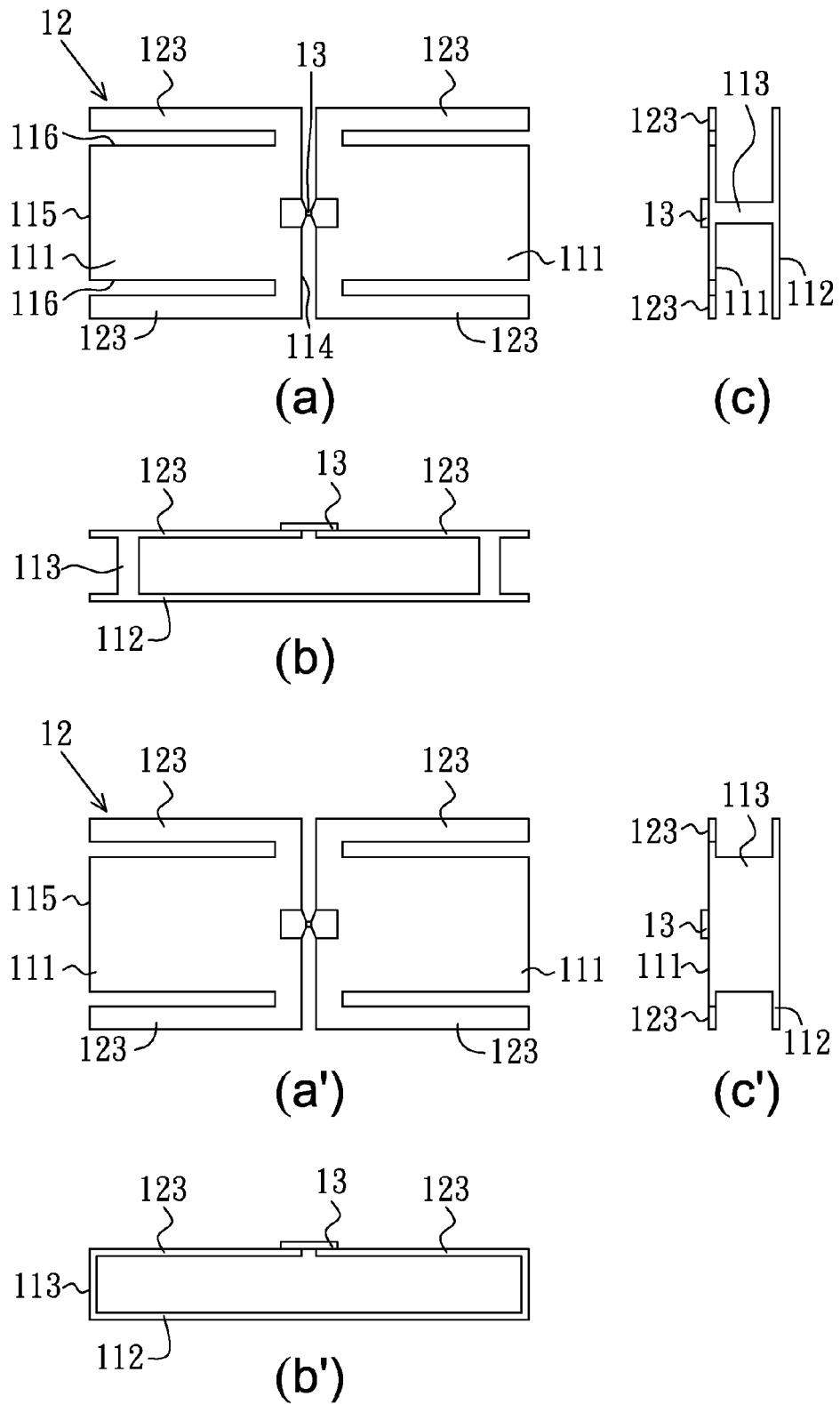

Alternatively, the capacitive load 12 may further comprise four first extension sheets 123, wherein each first extension sheet 123 is connected to a third side 116 of the metal sheet 111 at place near the first side 114 and extends along the direction approaching the second side 115, and each first extension sheet 123 is essentially parallel to the third side 116. Two corresponding third sides 116 of each metal sheet 111 are located between the first side 114 and the second side 115 (as shown in FIG. 5). Each first extension sheet 123 and part of the metal sheet 111 disposed on the third side 116 produce capacitive load.

Figure 6:
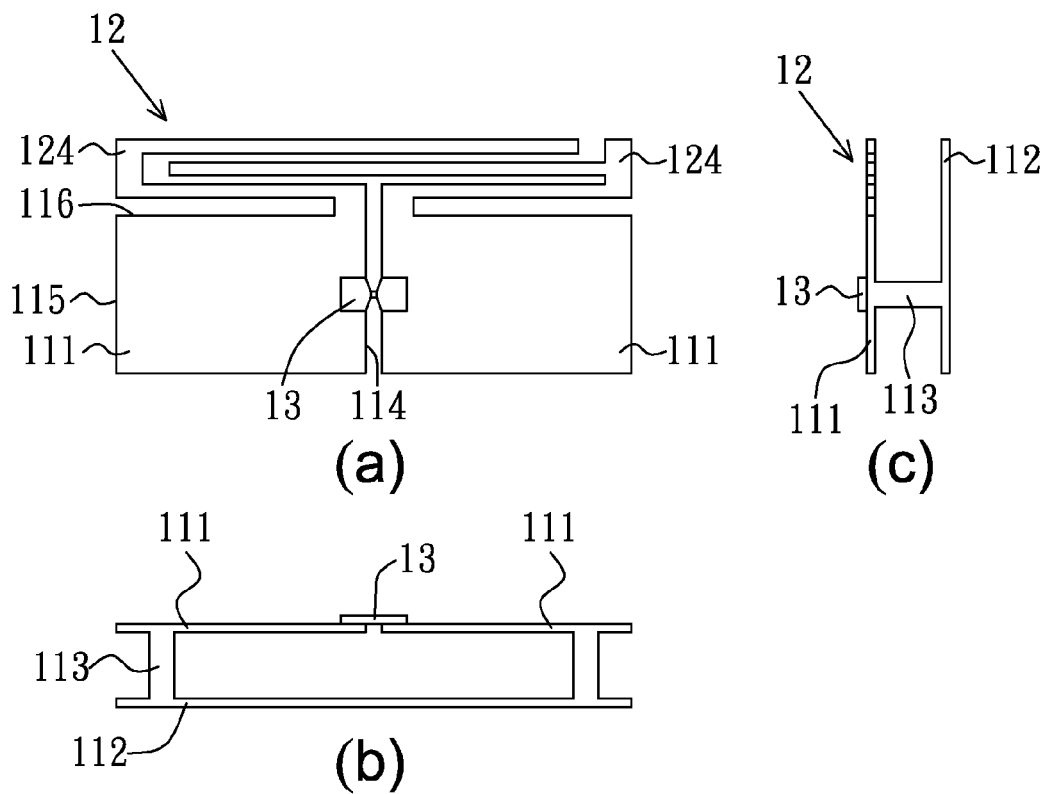

Alternatively, the capacitive load 12 may further comprise two second extension sheets 124, wherein the second extension sheets 124 are disposed on the same side of the metal sheets 111, each second extension sheet 124 is connected to a third side 116 of the metal sheet 111 at place near the first side 114, and each second extension sheet 124 extends along the direction approaching the second side 115 which is essentially parallel to the third side 116, backward along the direction approaching the first side 114, and further toward the second side 115 on the other side. The second extension sheets 124 extend crisscross to form a finger-crossed structure (as shown in FIG. 6).

Figure 7:
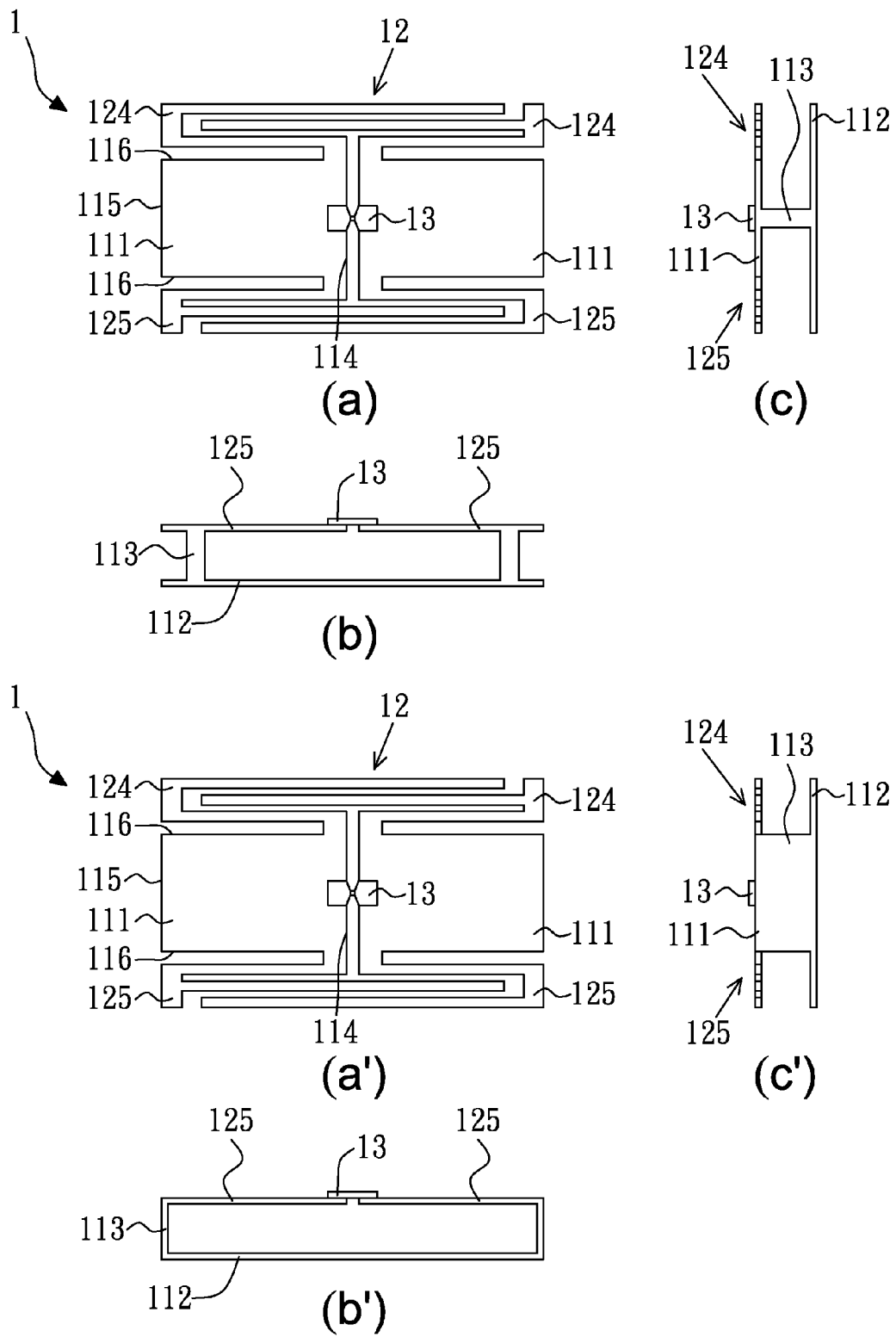
Figure 8:
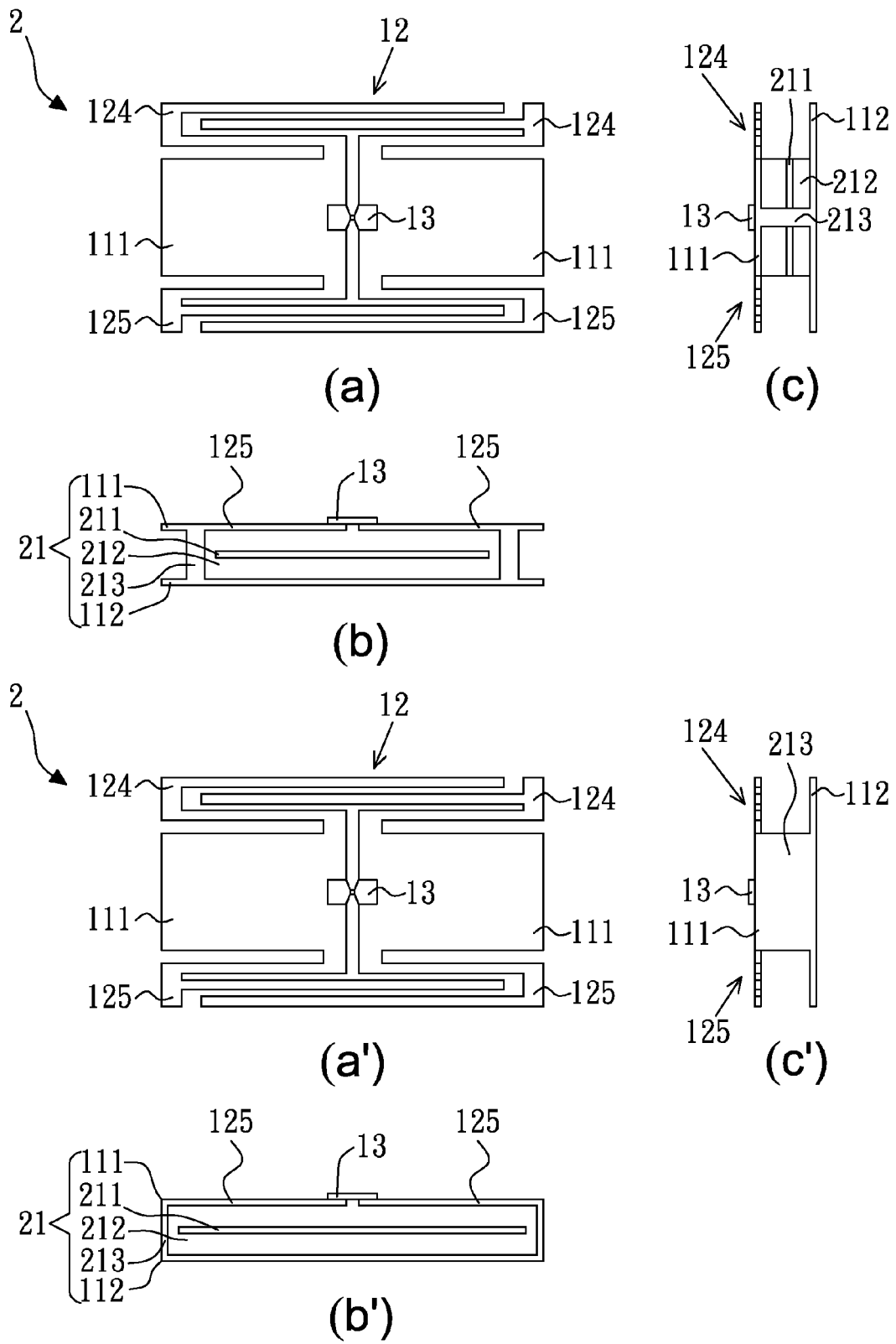
FIG. 8 is a schematic view of an RFID tag having capacitive load according to a second embodiment of the present invention.

Alternatively, the capacitive load 12 may comprise two second extension sheets 124 and two third extension sheets 125, wherein the third extension sheets 125 and the second extension sheets 124 are disposed on two corresponding sides of the metal sheets 111, each third extension sheet 125 is connected to a third side 116 of the metal sheet 111 at place near the first side 114, and each third extension sheet 125 extends along the direction approaching the second side 115 which is essentially parallel to the third side 116, backward along the direction approaching the first side 114, and further toward the second side 115 on the other side. The second extension sheets 124 and the third extension sheets 125 extend crisscross to form a finger-crossed structure (as shown in FIG. 7).

FIGS. 8(a) to 8(c) and FIGS. 8(a') to 8(c') show schematic views of two forms of an RFID tag having capacitive load according to a second embodiment of the present invention. The RFID tag 2 having capacitive load according to the embodiment is substantially the same as the RFID tag 1 having capacitive load according to the first embodiment (FIG. 7), with the only difference in the structure of the antenna unit 21. In this embodiment, the antenna unit 21 further includes at least one substrate metal layer 211 and a substrate dielectric material 212, the at least one substrate metal layer 211 is disposed between the metal sheets 111 and the conductive substrate 112, and the substrate dielectric material 212 is disposed between the at least one substrate metal layer 211 and the metal sheets 111 and between the at least one substrate metal layer 211 and the conductive substrate 112. The other parts of the RFID tag 2 having capacitive load which are the same as the RFID tag 1 having capacitive load according to the first embodiment (FIG. 7) are designated by the same reference numbers, and therefore the description is skipped.

It is noted that the conductive portions 213 of the antenna unit 21 may be conductive pillars or conductive sheets. The antenna unit 21 may also further include the structure of any kind of capacitive loads 12 as shown in FIG. 4, 5 or 6.

The RFID tags 1, 2 having capacitive load according to the present invention may be designed to have the frequency band of UHF (Ultrahigh-frequency), 2.45 GHz or 5.8 GHz, and may be disposed on the surface of metal material products for management (e.g. inventory management) of metal material products.

Figure 9:
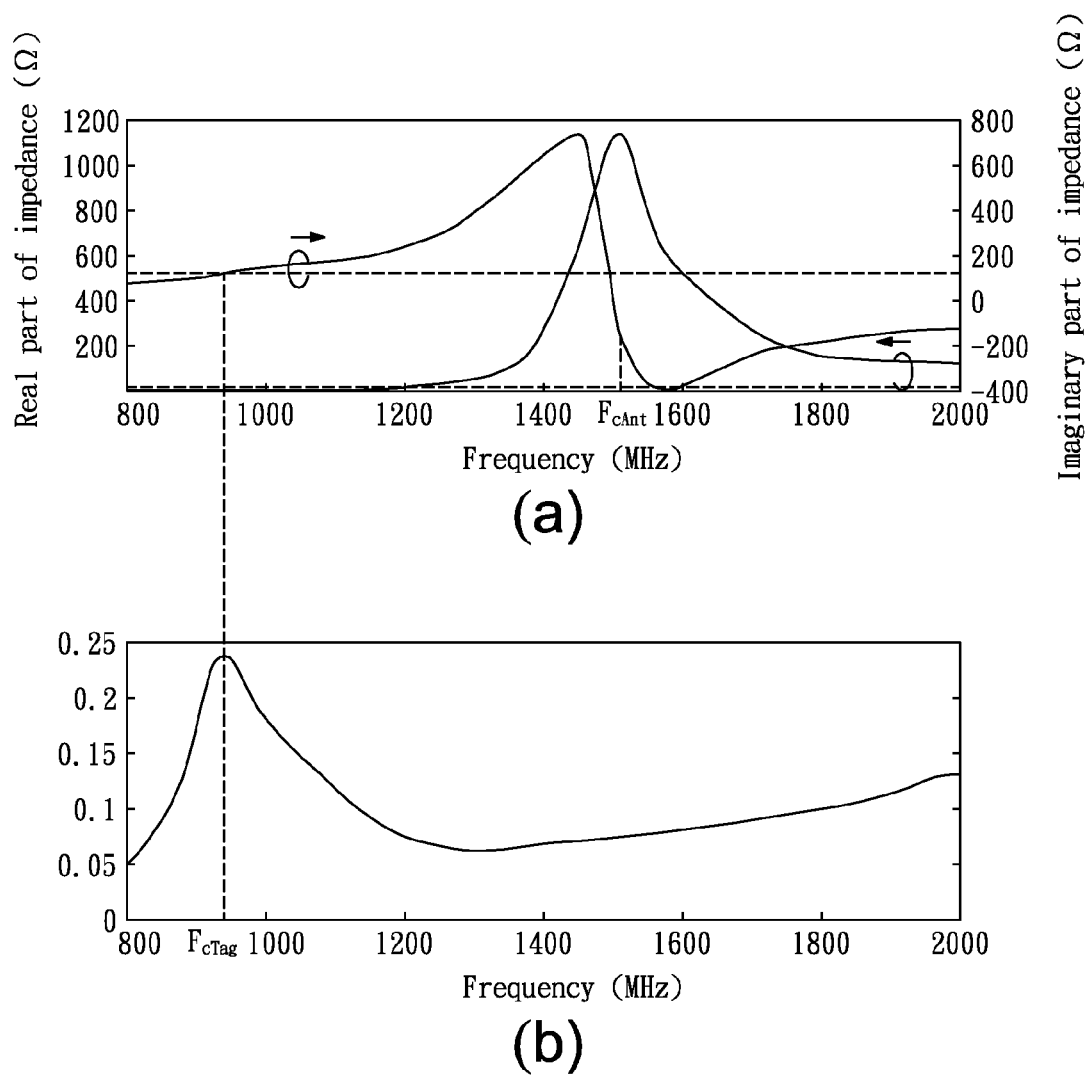
FIG. 9 is a schematic view of characteristic impedance and operating frequency of an RFID tag.

FIG. 9(a) shows a schematic view of characteristic impedance of an RFID tag; FIG. 9(b) shows a schematic view of operating frequency of an RFID tag. In FIG. 9(a), the operating frequency of the RFID tag falls on $F_{cAnt}$ (about 1500 MHz); in FIG. 9(b), the goal operating frequency of the RFID tag falls on $F_{cTag}$ (about 930 MHz). The RFID tags having capacitive load according to the present invention have capacitive load, which dramatically decreases the operating frequency thereof and make it fall on the goal operating frequency $F_{cTag}$.

Figure 10:
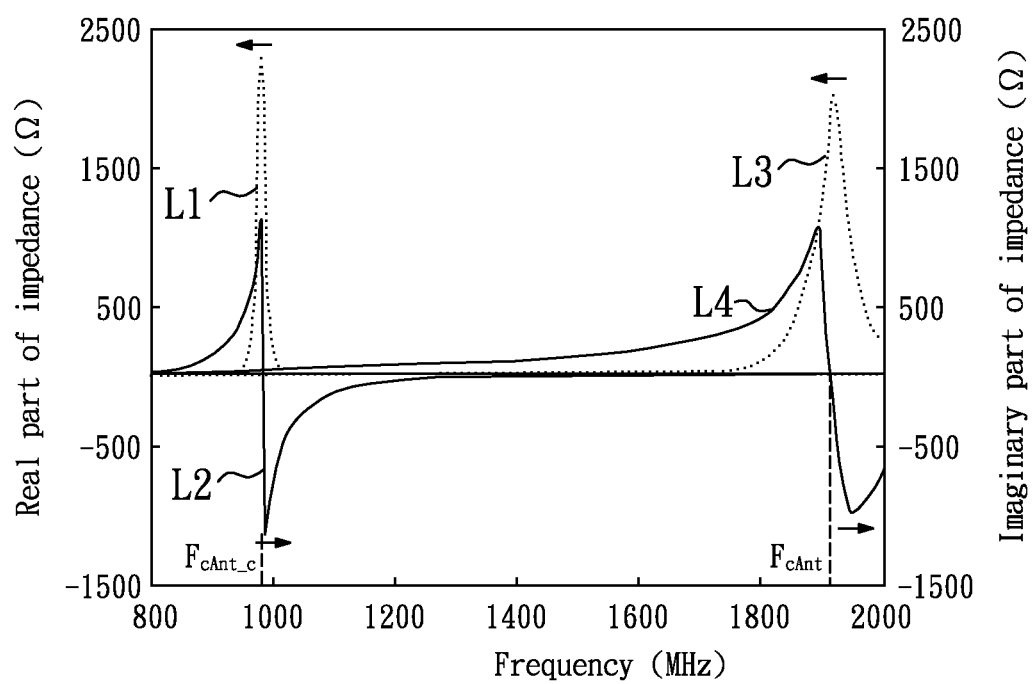
FIG. 10 is a schematic view of a comparison between the characteristic impedance of an RFID tag having capacitive load according to the present invention and that of an RFID tag without capacitive load.

FIG. 10 shows a schematic view of characteristic impedance comparing an RFID tag having capacitive load according to the present invention with an RFID tag without capacitive load. The dotted line L1 is the curve of the real part of impedance of the RFID tag having capacitive load according to the present invention, and the solid line L2 is the curve of the real part of impedance of the RFID tag having capacitive load according to the present invention; the dotted line L3 is the curve of the real part of impedance of the RFID tag without capacitive load, and the solid line L4 is the curve of the real part of impedance of the RFID tag without capacitive load.

As shown in FIG. 10, the imaginary part of impedance of the RFID tag without capacitive load is about 1000Ω, and the operating frequency $F_{cAnt}$ thereof falls on about 1900 MHz; as shown in FIG. 10, the imaginary part of impedance of the RFID tag having capacitive load according to the present invention is increased to about 120Ω, and the operating frequency $F_{cAnt\_c}$ thereof is dramatically decreased to about 980 MHz. Moreover, as a comparison of the dotted line L1 with the dotted line L3 shows, the real part of impedance of the RFID tag having capacitive load according to the present invention is also greater than that of the RFID tag without capacitive load.

As described above, the RFID tags having capacitive load according to the present invention can dramatically decrease the operating frequency, so the imaginary part of impedance is higher with the same size of the antenna unit, thereby reducing the size of the RFID tag. As a result, the weight is reduced, the manufacture process is simplified (mass production directly by PCB process is possible) and the subsequent structure can be easily adjusted.

While several embodiments of the present invention have been illustrated and described, various modifications and improvements can be made by those skilled in the art. The embodiments of the present invention are therefore described in an illustrative and not restrictive sense. It is intended that the present invention should not be limited to the particular forms as illustrated, and that all modifications which maintain the spirit and scope of the present invention are within the scope defined in the appended claims.

What is claimed is:

1. An RFID tag having capacitive load, comprising:
   an antenna unit, including two metal sheets and a conductive substrate, wherein the metal sheets are disposed at a corresponding position above the conductive substrate and electrically connected to the conductive substrate, and each metal sheet includes a first side, a second side corresponding to the first side and two third sides, the first sides of the metal sheets are close to and face each other, two third sides of each metal sheet are located between the first side and the second side;
   a capacitive load, electrically connected to the metal sheets and comprising two second extension sheets, wherein the second extension sheets are disposed on the same side of the metal sheets, and each second extension sheet is connected to the third side at place near the first side; and
   an RFID device, feeding the antenna unit by electrically connecting to the metal sheets or coupling.

2. The RFID tag as claimed in claim 1, wherein each second extension sheet extends along the direction approaching the second side which is essentially parallel to the third side and extends backward along the direction approaching the first side.

* * * * *